United States Patent [19]

Tonomura et al.

[11] 4,364,082

[45] Dec. 14, 1982

[54] PHASE DETECTION CIRCUIT AND AUTOMATIC TINT CONTROL CIRCUIT OF COLOR TELEVISION RECEIVER UTILIZING THE SAME

[75] Inventors: Kenichi Tonomura, Tachikawa; Kyoichi Takahashi, Kodaira, both of Japan

[73] Assignees: Hitachi, Ltd.; Hitachi Microcomputer Engineering Ltd., both of Japan

[21] Appl. No.: 235,608

[22] Filed: Feb. 18, 1981

[30] Foreign Application Priority Data

Mar. 12, 1980 [JP] Japan .................................. 55-30374

[51] Int. Cl.³ ...................... H04N 9/535; H03D 3/18
[52] U.S. Cl. ......................................... 358/28; 329/50
[58] Field of Search ............................ 358/28, 19, 25; 328/133, 134; 329/50

[56] References Cited

U.S. PATENT DOCUMENTS 2,971,086  2/1961  Feijoo et al. ........................ 328/133
4,006,423  2/1977  Kuniyoshi et al. .................... 358/19
4,227,205  10/1980  Gomi ..................................... 358/28

Primary Examiner—John C. Martin
Attorney, Agent, or Firm—Antonelli, Terry and Wands

[57] ABSTRACT

The phase detection circuit includes a first phase detector for receiving an input signal and a first reference signal, a second phase detector for receiving the input signal and a second reference signal having a different phase from that of the first reference signal and a level discriminator for receiving the phase detection output of the first phase detector. The detection operation of the second phase detector can be inhibited directly by means of the discrimination output of this level discriminator. Accordingly, the phase detection output can be obtained from this phase detection circuit only when the phase difference between the input signal and the first reference signal falls within a predetermined range. The phase detection circuit having such a limiting function is suitable for application to an automatic tint control circuit of a color television receiver.

4 Claims, 4 Drawing Figures

PHASE DETECTION CIRCUIT AND AUTOMATIC TINT CONTROL CIRCUIT OF COLOR TELEVISION RECEIVER UTILIZING THE SAME

BACKGROUND OF THE INVENTION

This invention relates to a phase detection circuit and to an automatic tint control circuit of a color television receiver.

The phase detection circuit forms an output in accordance with the difference between the phases (frequencies) of two input signals and is widely used for phase (frequency) control in television circuits. However, in performing phase control or the like, it is often desirable to restrict the control range.

Japanese Patent Laid-Open Specification No. 50-51626, for example, discloses an automatic tint control circuit which controls the phase of a reference color subcarrier signal applied to a color demodulator in order to reduce the variance of the relative phase difference between a chroma signal and a burst signal which may result from changes in the characteristics of a signal transmission line or may be due to the channel selection in the color television receiver.

In such an automatic tint control circuit, when the phase of a chroma signal of which the phase coincides with an I axis deviates for some reason or other by a quantity of phase difference $\theta$, for example, the phase of a reference color subcarrier signal to be applied to the color demodulator is corrected in accordance with the deviation quantity so that a correct tint is reproduced in the picture reproduced on the screen of the cathode ray tube (CRT). This phase correction of the reference color subcarrier signal is effected within the range of a limited deviation quantity in order to prevent the correction from being effected for all the deviation quantities and to prevent all the optional chroma signals from being processed as chroma signals having phases which coincide with the I axis.

In order to restrict the control range of the phase correction, in the above-mentioned automatic tint control circuit, there is provided a phase detection circuit in which chroma signals are impressed upon a first detector and a second detector, respectively; a first reference signal and a second reference signal, each having a different phase from the other, are impressed upon the first and second detectors, respectively; the output of the first detector is impressed upon a clipper; the output of this clipper and the output of the second detector are impressed upon a multiplier; and the output of this multiplier generates a control signal having a restricted phase range.

SUMMARY OF THE INVENTION

However, in accordance with the present invention, it has been found, as a result of investigation, that the above-mentioned prior phase detection circuit is disadvantageous in that it has a complicated circuit construction.

Accordingly, the present invention is directed to a phase detection circuit which is simple in circuit construction and is capable of obtaining a detection output only for an input signal falling within a predetermined range of the phase difference relative to the reference signal.

According to the fundamental feature of the present invention, phase detection of input signals is effected by means of reference signals having mutually-different phases and one of the phase detection outputs is applied to a level discriminator in such a fashion as to directly limit the phase detection operation of the other by means of its discrimination output.

DESCRIPTION OF THE PREFERRED EMBODIMENTS

Hereinafter, the present invention will be described in further detail with reference to the accompanying drawings.

Figure 1:
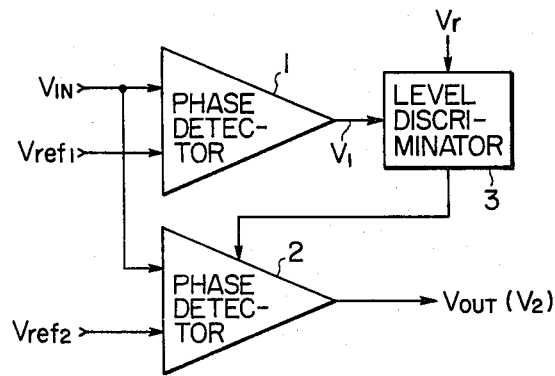
FIG. 1 is a block diagram showing an embodiment of the present invention.

FIG. 1 is a block diagram showing an embodiment of the phase detection circuit in accordance with the present invention. This embodiment includes a first phase detector 1 for receiving an input signal $V_{IN}$ and a first reference signal $V_{ref1}$, a level discriminator 3 for receiving the phase detection output of the first phase detector 1 and a second phase detector 2 for receiving the above-mentioned input signal $V_{IN}$ and a second reference signal $V_{ref2}$ having a different phase from the first reference signal $V_{ref1}$. In this arrangement one of the level discrimination outputs of the level discriminator 3 directly inhibits the detection operation of the second phase detector 2 to obtain a detection output $V_{OUT}$ from the second phase detector 2.

As the method of directly inhibiting the detection operation of the second phase detector 2, any of the following three methods may be employed. The first disposes gate means in either the input $V_{IN}$ or $V_{ref2}$ to inhibit the application of the input to the detection. In other words, since the phase detector effects multiplication of two input signals, the output becomes zero if one of the inputs is zero. The second method disposes gate means in the output so as to inhibit the transmission of the output from the detector. The third cuts off a bias current of the phase detector 2 so as to stop its operation.

Figure 2:
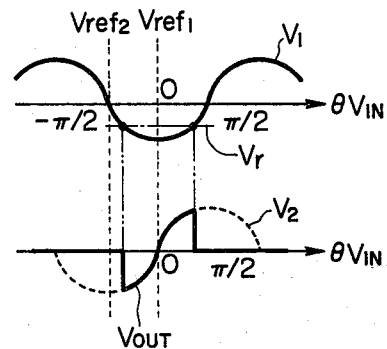
FIG. 2 is a characteristic diagram useful for explaining the operation of the block diagram of FIG. 1.

The operation of the phase detection circuit will be described with reference to the detection characteristic diagram of FIG. 2. It will now be assumed that the phase of the first reference signal $V_{ref1}$ is advanced by $\pi/2$ as compared with the second reference signal $V_{ref2}$, and that the first reference signal $V_{ref1}$ serves as the reference signal for the input signal $V_{IN}$. In this case, the detection outputs $V_1$ and $V_2$ of the detectors 1 and 2 have characteristics as shown in FIG. 2.

Since the phase detection circuit inhibits the operation of the second detector 2 when the discrimination output exceeds a threshold voltage $V_r$ of the level discriminator 3 which receives the first detection output $V_1$ as its input, or, since the phase detection circuit actuates the second detector 2 only when a detection output $V_1$ below the discrimination level $V_r$ is obtained, the output $V_{OUT}$ can be obtained only within the range indicated by the solid line in FIG. 2. By changing the setting of the above-mentioned discrimination level $V_r$, the detection output can be obtained optionally only within a range in which the phase difference between the input signal $V_{IN}$ and the reference signal $V_{ref1}$ is from $-\pi/2$ to $+\pi/2$.

Figure 3:
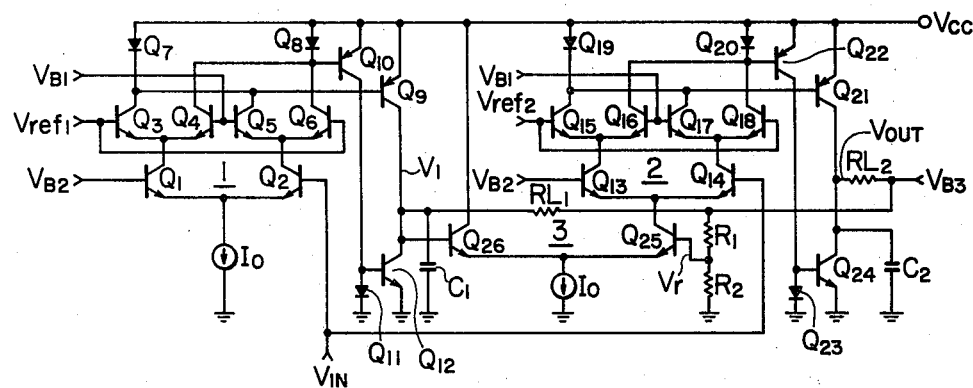
FIG. 3 is a circuit diagram showing a specific embodiment of the present invention.

FIG. 3 is a circuit diagram showing a definite embodiment of this invention. The phase detection circuit of this embodiment uses balanced differential type multipliers. The circuit includes differential transistors $Q_1$ and $Q_2$ having a constant current circuit $I_o$ connected in common to the emitters thereof, differential transistors $Q_3$ and $Q_4$ having their emitters commonly connected to the collector of transistor $Q_1$ and differential transistors $Q_5$ and $Q_6$ having their emitters likewise connected in common to the collector of transistor $Q_2$. In addition, a bias voltage $V_{B2}$ is applied to the base of the transistor $Q_1$, an input signal $V_{IN}$ is applied to the base of the transistor $Q_2$, a base voltage $V_{B1}$ is applied in common to the bases of the differential transistors $Q_4$ and $Q_5$, a reference signal $V_{ref1}$ is applied to both of the bases of the differential transistors $Q_3$ and $Q_6$ and the collectors of the differential transistors $Q_3$ and $Q_5$ are connected together while the collectors of the transistors $Q_4$ and $Q_6$ likewise connected together to obtain a phase comparison output (multiplication output).

In this embodiment there is disposed, as a load circuit, a current mirror circuit consisting of diodes (the term "diode" hereinafter denotes also a diode-connected transistor) $Q_7$ and $Q_8$ and transistors $Q_9$ and $Q_{10}$ so that an extrusion current output of the transistor $Q_{10}$ as one of the outputs is converted into a suction current by a current mirror circuit consisting of diode $Q_{11}$ and $Q_{12}$ and is added to an extrusion current output from the transistor $Q_9$ as the other output to obtain a difference current output. In other words, the collectors of both transistors $Q_9$, $Q_{12}$ as the above-mentioned current mirror outputs are connected to each other and a load resistor $R_{L1}$ is interposed between their junction and a bias voltage $V_{B3}$ so as to obtain a detection output voltage $V_1$ by causing an output current which is twice the difference current between them to flow.

The second phase detector 2 consists of transistors $Q_{13}$ through $Q_{24}$ and a resistor $R_{L2}$ formed in a similar manner to the first phase detector. To restrict the operation, however, a transistor $Q_{25}$ as the level discriminator 3 is connected to the common emitter circuit of the differential transistors $Q_{13}$ and $Q_{14}$ upon which the input signal $V_{IN}$ is to be impressed, and a discrimination voltage level $V_r$ formed by dividing the bias voltage $V_{B3}$ by resistors $R_1$ and $R_2$ is applied to the base of this transistor $Q_{25}$.

There is also provided a transistor $Q_{26}$ that forms a pair of differential transistors with transistor $Q_{25}$ and the above-mentioned first detection output $V_1$ is applied to the base of this transistor $Q_{26}$. Its collector is connected to a power source voltage $V_{CC}$ and a constant current circuit $I_o$ is disposed in the common emitters of the transistors $Q_{25}$ and $Q_{26}$.

Accordingly, the second phase detector 2 operates only when the transistor $Q_{25}$ of the level discriminator 3 is turned on and passes the constant current $I_o$ through the balanced differential transistor circuit $Q_{13}$-$Q_{20}$. The transistor $Q_{25}$ is turned on only when the first detection output $V_1$ becomes lower than the above-mentioned discrimination level $V_r$ and when the former is higher than the latter, the transistor $Q_{26}$ is turned on while the transistor $Q_{25}$ is turned off so that the second detector 2 does not operate. Consequently, the output $V_{OUT}$ is limited by the bias voltage $V_{B3}$.

It should be noted that, in the circuit of the embodiment described above, the bias voltage $V_{B3}$ is divided as the discrimination level $V_r$, so that the output $V_{OUT}$ can be obtained only within the range of $\pm \pi/2$ with respect to the referenced signal $V_{ref1}$ in FIG. 2. If the range is to be expanded up to $\pm \pi$, the discrimination level may be set to a sufficiently-higher voltage relative to the bias voltage $V_{B3}$.

The present invention can be widely utilized as a phase detection circuit having a limiting function. As described in the foregoing, the tint of a color reproduced by a color television receiver is determined by the relative phase difference between a chroma signal and a burst signal, and since this phase difference involves variance due to the change in characteristics of a color television signal transmission line or to the selection of channels, it results in a variance of the tint on the reproduced picture. As to the major proportion of colors reproduced by a color television receiver, however, viewers of the television cannot discriminate a slight error in the tint because they have no means to compare the practical colors with the picture colors. Since the viewers are well aware of the ordinary flesh color, however, they can easily detect an error in the flesh color. Accordingly, there have been proposed various circuits for automatically correcting the error in the flesh color.

In this case, if the correction is operative over the entire tint range ($\pm \pi$), the optional chroma signals are reproduced as colors of the I axis (flesh color) phase on the picture surface so that the correction range need be restricted to a suitable range in the proximity of the I axis. The phase detection circuit of the present invention can be applied to such an application.

Figure 4:
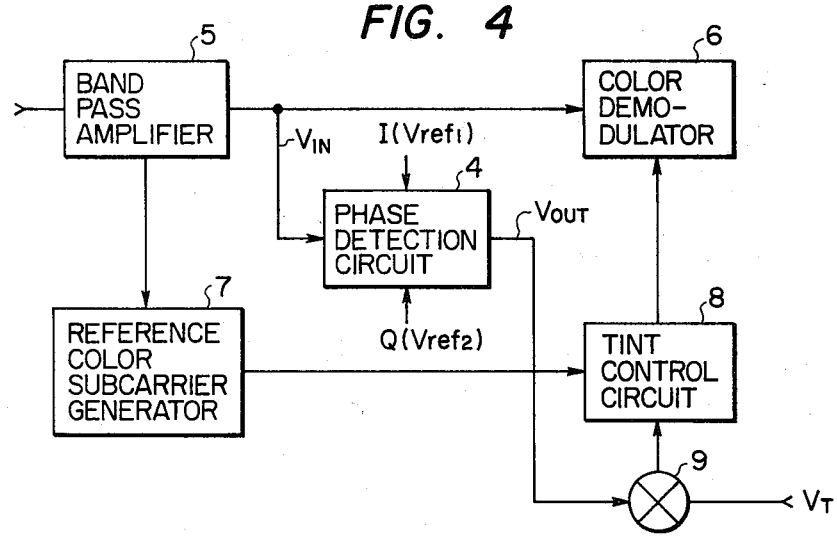
FIG. 4 is a block diagram showing another embodiment of the present invention.

Namely, as illustrated in FIG. 4, it is possible to form a flesh color correction circuit by use of the phase detection circuit 4 having the limiting function that has been explained as the foregoing embodiment. An I axis signal as the reference signal $V_{ref1}$ is applied to the above-mentioned phase detection circuit 4 with the Q axis signal being applied as the reference signal $V_{ref2}$. The chroma signal from a band pass amplifier 5 is applied as the input signal $V_{IN}$. The output $V_{OUT}$ of the above-mentioned phase detection circuit 4 is fed, as a correction signal, to the control input of a tint control circuit 8 for changing the phase of the reference color subcarrier signal which is transmitted from a reference color subcarrier generator 7 to a color demodulator 6.

It should be noted that the reference color subcarrier generator 7 generates a frequency signal in synchronism with the color burst signal, and that the signal $V_T$ applied to the control input of the tint control circuit 8 is a manual adjusting signal. Reference numeral 9 represents an adding circuit for adding this manual adjusting signal to the above-mentioned correction signal. More specifically, addition is effected by causing a correction current to flow through a variable resistor for shaping the above-mentioned signal $V_T$. A color demodulator 6 receives the chroma signal via the band pass amplifier 5 and the reference carrier signal $V_{IN}$ via the tint control circuit 8.

In the embodiment described above, the I- and Q-axes signals to be applied as the input signals to the phase detection circuit 4 for forming the flesh color correction signal are formed by a matrix circuit or a phase circuit (not shown) on the basis of the demodulation output or the reference color subcarrier signal formed by the above-mentioned color demodulator 6. When the phase detection circuit of this embodiment is employed for the purpose of correcting the flesh color in a color television picture, the setting of the correction range can be made optionally and hence, the circuit construction can be extremely simplified.

The present invention is not limited to the foregoing embodiments, in particular. For example, the phases of the two reference signals $V_{ref1}$ and $V_{ref2}$ may be changed in various manners besides the afore-mentioned $\pi/2$. Along with the change of the phases, the limiting range of the detection output may be made optionally asymmetric. Besides the afore-mentioned balanced differential type phase detection circuit, optional circuits may also be employed as its definite circuit construction.

The present invention can be widely utilized as a phase detection circuit having a limiting function.

While we have shown and described several embodiments in accordance with the present invention, it is understood that the invention is not limited to the details shown and described herein but is intended to cover changes and modifications obvious to one of ordinary skill in the art, and we, therefore, do not wish to be limited to the details shown and described herein but intend to cover all such changes and modifications known to those skilled in the art.

What is claimed is:

1. An automatic tint control circuit for a color television receiver comprising:
    a first phase detector having respective inputs to which a chroma signal and a first reference signal are to be impressed;
    a second phase detector having respective inputs to which said chroma signal and a second reference signal are to be impressed;
    level discriminator means responsive to the output signal of said first phase detector for directly inhibiting the operation of said second phase detector in accordance with the level of said output signal of said first phase detector.

2. An automatic tint control circuit as defined in claim 1, further including reference color subcarrier generator means for forming a signal in synchronism with an applied color burst signal, and tint control means for transmitting the signal obtained from said reference color subcarrier generator means from the input to the output thereof and for changing the phase of the signal transmitted to the output thereof in accordance with the output signal of said second phase detector.

3. The automatic tint control circuit for a color television receiver as defined in claims 1 or 2, wherein said second phase detector includes a balanced differential type multiplier; said level discriminator includes first and second transistors having their emitters connected to each other and a constant current circuit connected to the emitters of said first and second transistors; and further including means for applying a reference voltage for level discrimination to the base of said first transistor and means for applying the output signal of said first phase detector to the base of said second transistor; the collector of one of said first and second transistors being connected to said balanced differential multiplier of said second phase detector.

4. The automatic tint control circuit for a color television receiver as defined in claim 6, wherein said first phase detector also includes a balanced differential type multiplier.

* * * * *